UNITED STATES PATENT OFFICE.

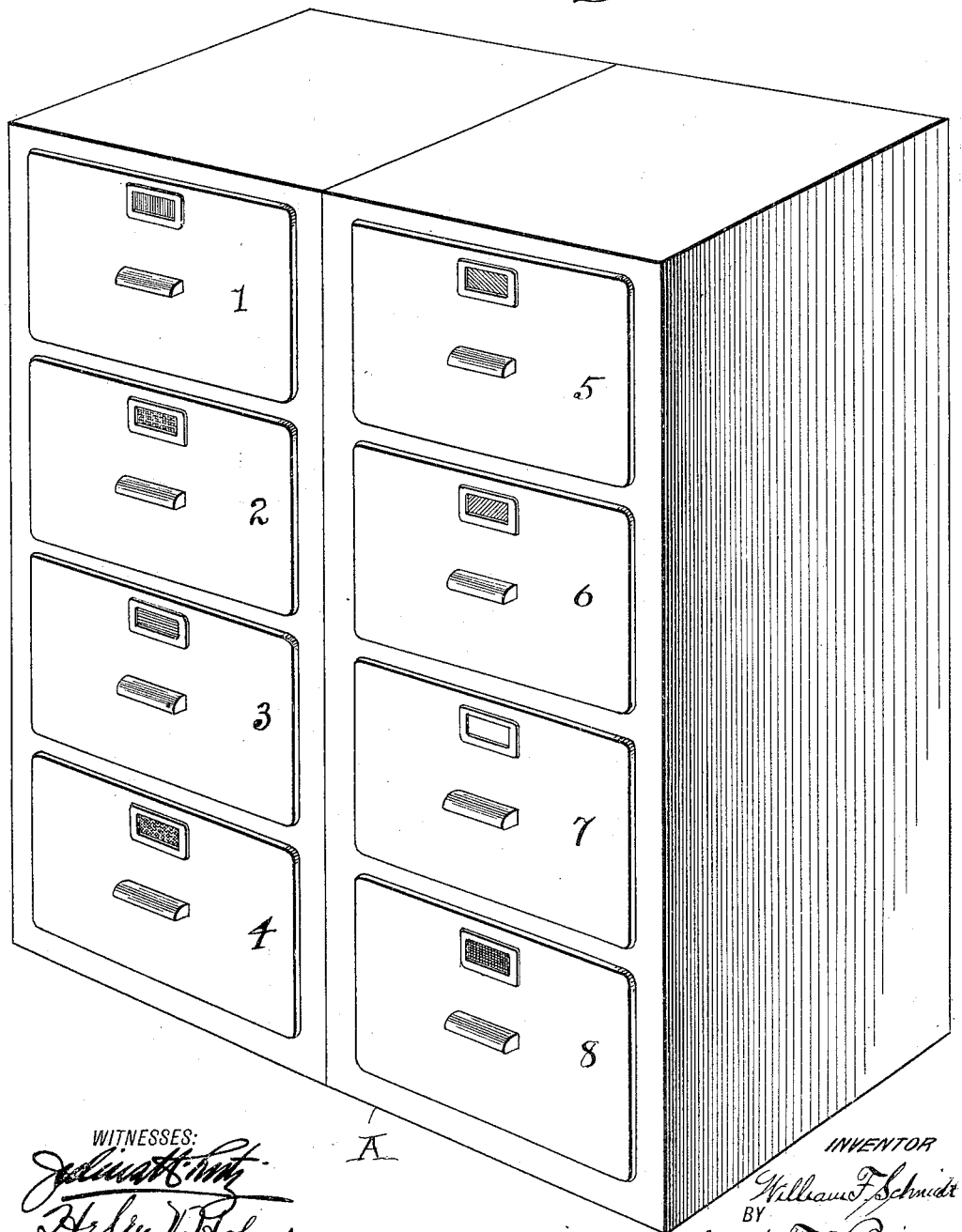

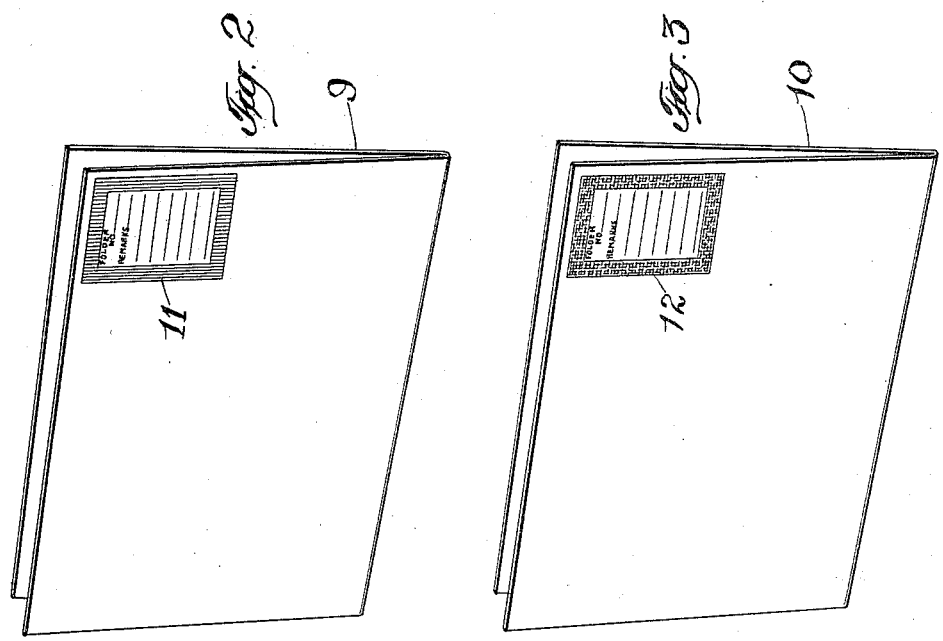

WILLIAM F. SCHMIDT, OF RIDGEWOOD, NEW JERSEY.

ALPHABETIC FILING SYSTEM AND OUTFIT.

1,232,096.  Specification of Letters Patent.  Patented July 3, 1917.

Application filed May 1, 1916. Serial No. 94,659.

*To all whom it may concern:*

Be it known that I, WILLIAM F. SCHMIDT, a citizen of the United States, and a resident of Ridgewood, Bergen county, and State of New Jersey, have invented certain new and useful Improvements in Alphabetic Filing Systems and Outfits, of which the following is a specification.

This invention relates to improvements in alphabetic filing systems and outfits.

By the use of my invention, the main alphabetic divisions of an alphabetic filing system will be greatly reduced in number and the subdivisions of each main division will be so increased as to provide greater latitude or possibilities of expansion and contraction than has been possible heretofore in filing systems based on the alphabet. The usual, confusing alphabetic designations for the divisions and subdivisions will be eliminated, a key-controlled series of colors being employed to designate the main divisions, while key-controlled numeric designations having definite numeric sequence will be employed for the subdivisions. The color designation of a main division will preferably also be employed as a partial designation of all subdivisions of a main division.

Furthermore my simple and novel color classification key for the main divisions, in which the alphabet is divided at its vowels and semi-vowels and a color assigned to each division, not only enables a filing clerk to instantaneously classify or group without the use of an index any given unit of intelligence or filing matter but provides an aid to memory as to its grouping, gives an initial distribution of great uniformity and permits the double or multiple use without confusion, of the numeric designations for the subdivisions. Also my novel and simple number-assignment key, in which the digits are placed in squared relation to and identified with isolated letters of the alphabet viz., letters isolated from their neighboring letter or letters as distinguished from groups of letters, permits a digit together with all its possible numeric combinations with the other digits, to be assigned to or identified with an initial alphabetic letter and the various combinations thereof which are practicable for use in a filing system. In this way, an arrangement of the subdivisions in definite numeric sequence is obtained; a great increase over other systems in the possible number of subdivisions is procured and great latitude or possibility of expansion and contraction is provided while maintaining the manifold advantages of said numeric sequence, and avoiding the use of an index.

A filing clerk will, therefore, be enabled with great rapidity to place definitely in a properly designated subdivision of the main division any given unit of intelligence. Furthermore, such unit of intelligence will, because of its definite location, the rapidity with which the alphabetic combination of such unit may be translated by the use of the key into the numeric combination, and the well known ease and rapidity with which a sequential numeric system may be handled and referred to, and always be readily and quickly available. Furthermore, because of the large number of subdivisions which are available though not necessarily employed, the unit of intelligence may be filed with substantial finality and the increase or decrease of the number of units of intelligence or in the amount of filing matter will not affect the sequential location of the filed units or matter.

In the accompanying drawings in which similar references characters designate corresponding parts throughout the several views, Figure 1 is a perspective view of a filing cabinet in which the drawers of the cabinet are made to form main divisions of my system, and are accordingly designated by colors;

Fig. 2 is a perspective view of a subdivision or folder adapted to be inserted in the red division;

Fig. 3 is a perspective view of another subdivision or folder adapted to be inserted in the yellow main division; and Fig. 4 is a chart containing respectively my novel color classification key and my number assignment key employed in my filing system.

Referring now to these drawings which illustrate a preferred embodiment of my invention, A indicates a filing cabinet which, as shown, is divided into eight main divisions or drawers which in accordance with my filing system are each marked with a distinguishing color preferably in the following sequential order. The drawer 1 is marked with the primary color "red," the drawer 2 with the primary color "yellow,"

the drawer 3 with the primary color "blue," the drawer 4 with the secondary color "orange," the drawer 5 with the secondary color "green," the drawer 6 with the secondary color "purple," the drawer 7 with the basic color "white" and the drawer 8 with the color "black." These color designations with the exception of the color "black," which is preferably reserved for confidential communications, are, by means of a color-classification key shown at the top of the chart in Fig. 4, identified with the alphabet, so that a unit of intelligence to be grouped or classified may, through its alphabetical character, be instantaneously classified as belonging to a predetermined group.

It will be obvious that the prismatic colors used will be readily discernible and distinguishable by an operator at a greater distance than would for instance alphabetic designations, and furthermore the elimination of such alphabetic designations for the main divisions of the file will not only tend to greatly simplify the designations of the main divisions but when such color designations are used in combination with the numeric designations hereinafter referred to will permit a great reduction of the main divisions of the system.

In identifying such colors with the alphabet I preferably divide the alphabet into sections, each beginning with a vowel or a semi-vowel, and one of said colors is assigned to each of these alphabetic sections. By so subdividing the alphabet, I provide an aid to memory and also produce an initial distribution of great uniformity.

The main divisions so designated as aforesaid are subdivided preferably into numeric subdivisions each of which, as illustrated herein, preferably comprises a folder such as illustrated by the numerals 9 and 10 respectively, (Figs. 2 and 3). Each of these subdividing folders is preferably provided with a color designation corresponding to the color of the main division or group in which it is adapted to be employed or inserted. For example, the folder 9 (Fig. 2) has printed thereon in red an oblong symbol 11 and the folder 10 has printed thereon in yellow a similar symbol 12. The folders so marked or designated are preferably furnished to the user in sets and it will be obvious that a set of such folders will be useful independently of the compartments comprising aforesaid main divisions and may be employed as a temporary color-classification outfit. Furthermore, a folder so designated will, when removed from its place in a drawer, irrevocably retain its group classification as well as its numeric designation the derivation of which will now be described.

When a folder is to be employed as a subdivision, it is, independently of its color classification, given a numeric designation by means of the number-assignment key shown in Fig. 4, in which key each of the digits or numbers 1 to 10 are identified with one or more isolated alphabetic letters as distinguished from identifying a digit or number with a group of such letters. Preferably the digits are placed in squared relationship to and identified with the alphabet. In this key as illustrated the seven vowels and semi-vowels are omitted for the purpose of providing compactness, reducing the size of and simplifying the key and also to so reduce the number of letters as to make the same divisible by the total number of digits, to wit: ten. The aforesaid omissions leave remaining nineteen consonants which with the character "&" makes twenty characters which when divided in half and placed in double rows, as illustrated in said number assignment key, may be columned and alined evenly in squared relationship with said digits 0 to 9 inclusive. By placing the digits in such squared relationship to the consonants, as illustrated in the said key in said Fig. 4, I am enabled to permit a digit and all possible and interchangeable numeric combinations of the other digits therewith to be readily assigned to and identified with one or more isolated consonants or alphabetic characters in the key and such combinations with said character as will be found in a filing title, and I may allow the omitted vowels and semi-vowels to be given the designation "0". The vowels and semi-vowels may be so designated without any confusion whatsoever and the doubling up of two consonants may be accomplished without any repetition and confusion whatsoever because of the isolation of the characters so doubled, the previous splitting up into groups of such alphabetic characters and the identification of a color with each group. Thus, while the characters B and N, for example, are placed in precisely the same relationship with the digits, the main or colored divisions of such characters will be different and therefore will be readily distinguishable. This double identification, therefore, of the isolated alphabetic characters first with a color symbol and then with a number permits without confusion the use of similar numerals in differently colored main divisions and consequently increases the number of times the same numerals may be employed. Notwithstanding the compactness and simplicity of the key illustrated, it provides a great increase over other systems in the possible number of subdivisions and gives great latitude and possibilities of expansion and contraction, while maintaining its numeric sequence. It will be apparent, therefore, that the filing clerk will be enabled with great rapidity to place definitely in a subdivision having its proper numeric and color designations any given unit of intelligence and that the units of intelligence in any such subdivision as they multiply therein may be arranged alphabetically. Furthermore, any such unit of intelligence will, because of its definite location, the rapidity with which the alphabetic combination of such unit may be translated into the numeric combination, and in view of the well known ease and rapidity with which a sequential numeric system may be handled and referred to, always be readily and quickly available.

The omission of the vowels and semi-vowels and the arrangement of the consonants as illustrated, together with their alinement with the squared digits, will provide an aid to memory in case of the loss of the chart because in the color key the vowels split the alphabet into sections while in the numeric key the vowels are omitted.

The operation of my filing system applied to a system in which three-letter combinations are employed is as follows:

The grouping of the units into main divisions is accomplished by taking the first letter of the heading, title or subject of the unit of intelligence, consulting the color-classification key and designating either mentally or by writing the color division in which such letter is found. Thus "Automobiles" the first letter being "A" is grouped in the red division and "Reports", the first letter being "R" will be found in the orange division. Now, for the purpose of placing the word "Automobile" in its numerically-designated subdivision, we take the first three letters "Aut" thereof and, consulting the number-assignment key, we find that the letters "a" and "u" being vowels will give us two ciphers, "00"; there is therefore but one letter to designate with a numeral. Consulting the alphabetic letters extending horizontally we find that directly beneath "t" in the first horizontal row of figures is the numeral 6 so that the numeric designation of the subdivision will be 006. Thus the title, heading or subject "Automobile" will be filed in subdivision "006" of the red main division. Taking the word "Reports", the first three letters being "Rep" the numeral "4" will be found in the first horizontal row under R and this will give as the first numeral of the designation the number "4", the next letter "e" being a vowel gives a cipher and we have the partial designation "40"; for the designation of the next consonant "p" we consult the letters extending vertically and take that one of the series of numerals placed in horizontal alinement with the letter "p" which is in the same vertical column or in vertical alinement with the initial letter. Thus the numeral which is in horizontal alinement with "p" and in vertical alinement with R is "5" and we get "405" as the numeric designation. The item "Reports" will, therefore, be filed in folder 405 in the red division or drawer. Taking the examples given on the chart as instructions, "Cat" will likewise be found to be folder 207 in the red drawer while R—Cl will be found to be 452, the third numeral being in the same vertical column as the first two but in horizontal alinement with the letter "l". Similarly A M A representing American Manufacturing and Selling Co. will have the designation 000 in the red drawer.

Having described my invention, I claim:

1. A filing outfit embodying a series of filing compartments each of which is identified with a subdivision of the alphabet divided at its vowels and each of which subdivisions is identified with a guiding color corresponding to each of the primary and secondary colors.

2. A filing outfit embodying a series of compartments each provided with a mark of a distinguishable color, and a color-classification key having the said colors identified respectively with sequential sections of the alphabet divided at the vowels.

3. A filing outfit embodying a series of compartments each provided with a mark of one of the primary and secondary or basic colors, and a color-classification key having the said colors identified respectively with sequential sections of the alphabet divided at the vowels.

4. A filing outfit embodying a color-classification key having marks of a plurality of colors suitably identified with sequential sections of the alphabet divided at the vowels, a series of compartments provided with color marks conforming with the colors of the marks on said key, and folders for each compartment having marks conforming in color with the mark on the compartment and on the key.

5. A filing outfit embodying a color-classification key having marks of a plurality of colors suitably identified with sequential divisions of the alphabet, a series of compartments adapted to receive folders and provided with color marks conforming with the colors of the marks on said key, and a number-assignment key for marking each folder with one of a series of sequentially-arranged numbers each of which is also identified with the alphabet.

6. A filing outfit embodying a color-classification key having marks of a plurality of colors suitably identified with sequential divisions of the alphabet, a series of compartments provided with color marks conforming with the colors of the marks on said key, folders for each compartment having marks conforming in color with the mark on the compartment and on the key, and a number-assignment key for marking each folder with one of a series of sequentially-arranged numbers each of which is also identified with the alphabet.

7. A filing outfit embodying a color-classification key having marks of a plurality of colors suitably identified with sequential divisions of the alphabet, a series of compartments provided with color marks conforming with the colors of the marks on said key, and a number-assignment key having a series of numeric characters grouped under and identified with a predetermined alphabetic division and also having the individual numeric characters of said series separately identified with other alphabetic characters.

8. A filing outfit embodying a color-classification key having marks of a plurality of colors suitably identified with sequential divisions of the alphabet, a series of compartments provided with color marks conforming with the colors of the marks on said key, and a number-assignment key having a digit and combinations thereof with other digits identifiable with a predetermined alphabetic letter and alphabetic combinations of other letters with said letter.

9. A filing outfit embodying a number assignment key having thereon a series of numbers so identified with isolated alphabetic letters as to permit each of the said numbers to be identified with an isolated alphabetic character and also to permit interchangeable combinations of said numbers to be identified with interchangeable combinations of the said letters.

10. A filing outfit embodying a number assignment key having thereon a series of digits so identified with isolated alphabetic letters as to permit each of the said digits to be identified with an isolated alphabetic letter and also to permit interchangeable combinations of the various digits of said series to be identified with interchangeable combinations of such letters.

11. A filing outfit embodying a number assignment key having numbers in horizontal and vertical intersecting columns and similar alphabetic characters in alinement with both the vertical and horizontal columns of such numbers.

12. A filing outfit embodying a number assignment key having digits in horizontal and vertical intersecting columns and similar alphabetic characters in alinement with both the vertical and horizontal columns of such digits.

In witness whereof, I have signed my name to the foregoing specification in the presence of two subscribing witnesses.

WILLIAM F. SCHMIDT.

Witnesses:
   HELEN V. HOLMES,
   JOSEPH GALLAGHER.

Copies of this patent may be obtained for five cents each, by addressing the "Commissioner of Patents, Washington, D. C."